UNITED STATES PATENT OFFICE.

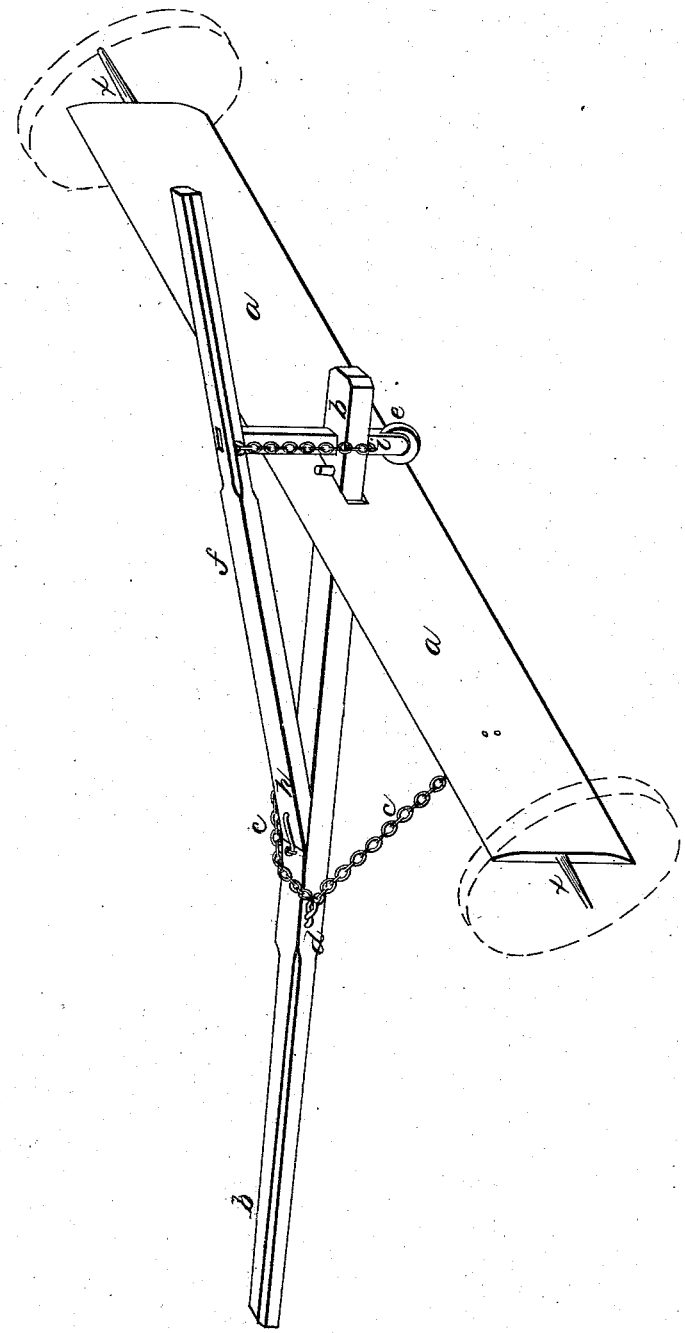

JNO. F. WOOD, OF HOUMA, LOUISIANA.

COMBINATION OF A GUIDE-TOOTH WITH AN INCLINED SCRAPER.

Specification of Letters Patent No. 7,448, dated June 18, 1850.

*To all whom it may concern:*

Be it known that I, JOHN F. WOOD, of Houma, in the parish of Terrebonne and State of Louisiana, have invented a machine called a "Continuous Earth-Scraper," and that the following is a full, clear, and exact description of the principle or character which distinguishes it from all other things before known and of the usual manner of making, modifying, and using the same, reference being had to the accompanying drawing, which represents a general view of the machine.

My improved scraper is constructed by affixing a scraper (*a*) properly to a shaft or tongue, to which the animals by which it is drawn are attached; the scraper is made of wood or metal, about ten feet long, and sixteen inches high; but of course the proportions may be materially changed; the tongue (*b*,) is made to pass through the center of the scraper, a mortise being there made for that purpose large enough to permit the tongue to be placed at a horizontal angle to the face of the scraper at about 45°, more or less; a chain (*c*,) extends from a staple in the scraper near each end, to a hook (*d*) on the tongue, by which the scraper is braced, and held at the proper angles; and by this means it is obvious that the angle can be easily determined, and the scraper can be made to incline toward the right or left, at pleasure, simply by lengthening one chain, and drawing up the other; the joint at the junction of the scraper and tongue being sufficient to permit the change without allowing a vertical motion of either, independently.

The rear end of the tongue projects some distance through the scraper, and from it a tooth or revolving guide cutter (*e*) projects down; below the lower edge of the scraper this tooth or cutter takes into the ground, by means of which the scraper is steadied and guided; this forms a most important feature in my machine as without it the scraper would be continually forced to one side and rendered inefficient; with this sharp guide, the implement is readily guided, and throws the earth scraped up properly to one side. The tooth or revolving cutter shank (*e*,) extends up to a lever or handle (*f*,) that is jointed to the tongue at (*h*,) in front of the scraper, and extends back inclined upward to a sufficient distance behind the scraper to form a handle. The depth of the guide projection below the scraper is regulated by elevating or depressing the handle of the lever (*f*) and when the cutter is raised out of the ground, it is held by a pin (*i*) passing through a hole in its shank below the tongue.

The implement thus formed can be drawn from one end of a ditch bank to the other, and carry back a portion of the dirt a given distance from the bank the whole way; the angle of the scraper can then be reversed, and the team, by returning, removes another portion of the earth in the same direction.

It is obvious that this machine is applicable to a variety of other purposes besides removing ditch banks, which in Louisiana requires so much manual labor, on each end of the scraper there is a journal onto which wheels are fitted, as shown by the red lines, to transport the machine from one field or ditch to another, these are taken off to work it.

Having thus fully described my improved scraper, what I claim therein as new, and for which I desire to secure Letters Patent, is—

The guiding tooth or revolving cutter, combined with the inclined scraper, substantially as above stated for regulating the course of the machine.

JOHN F. WOOD.

Witnesses:
   THOS. S. ARCHER,
   EDWARD EVERETT.